United States Patent
Yanazawa et al.

(10) Patent No.: US 10,153,630 B2
(45) Date of Patent: Dec. 11, 2018

(54) EXTERIOR END PORTION CAP AND WIRE HARNESS

(71) Applicants: YAZAKI CORPORATION, Tokyo (JP); TOYOTA JIDOSHA KABUSHIKI KAISHA, Aichi-ken (JP)

(72) Inventors: Kenta Yanazawa, Makinohara (JP); Takashi Tsukuda, Makinohara (JP); Ryohei Toyoda, Toyota (JP); Takahiko Kamiya, Toyota (JP); Kouji Yonezu, Toyota (JP); Tatsuyoshi Ueta, Toyota (JP); Takuma Miyazaki, Toyota (JP)

(73) Assignees: YAZAKI CORPORATION, Minato-ku, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/830,510

(22) Filed: Dec. 4, 2017

(65) Prior Publication Data

US 2018/0159309 A1    Jun. 7, 2018

(30) Foreign Application Priority Data

Dec. 6, 2016 (JP) ................ 2016-236460

(51) Int. Cl.
*B60R 16/02* (2006.01)
*H02G 15/04* (2006.01)
(Continued)

(52) U.S. Cl.
CPC ....... *H02G 15/043* (2013.01); *B60R 16/0215* (2013.01); *H01B 7/0045* (2013.01); *H02G 3/0468* (2013.01)

(58) Field of Classification Search
CPC .... B60R 16/0215; H02G 15/043; H02G 3/06; H02G 3/0616; H02G 3/0468; H01B 7/0045
(Continued)

(56) References Cited

U.S. PATENT DOCUMENTS 1,742,488 A  *  1/1930  Schneider ................ H01B 7/24
                                                       174/83
1,829,512 A  *  10/1931  Frederickson .......... H02G 3/02
                                                       174/83
(Continued)

FOREIGN PATENT DOCUMENTS

JP    2011-254614 A    12/2011
JP    2013-158225 A    8/2013
JP    2013-158226 A    8/2013

*Primary Examiner* — Chau N Nguyen
*Assistant Examiner* — Roshn K Varghese
(74) *Attorney, Agent, or Firm* — Sughrue Mion, PLLC

(57) ABSTRACT

An exterior end portion cap is configured to be attached to an electrically conductive path and an exterior member. The exterior end portion cap includes an external exposure portion having a first blocking portion, an internal insertion portion having a second block portion, and an electrically conductive path housing recess portion formed to extend across the external exposure portion and the internal insertion portion. The first blocking portion has a planar portion configured to abut against the exterior member. The second blocking portion has holding piece portions that are deformable to wind around the electrically conductive path circumferentially. The electrically conductive path housing recess portion is formed into a concave portion that is so deep that a part of an outer surface of the electrically conductive path is pressed against an inner surface of the exterior member.

7 Claims, 8 Drawing Sheets

(51) Int. Cl.
*H02G 3/04* (2006.01)
*H01B 7/00* (2006.01)

(58) Field of Classification Search
USPC ............... 174/74 R, 83, 152 G, 153 G, 665
See application file for complete search history.

(56) References Cited

U.S. PATENT DOCUMENTS

| | | | | |
|---|---|---|---|---|
| 2,018,939 A | * | 10/1935 | Wertzheiser | ............ H01B 7/24 |
| | | | | 174/83 |
| 2011/0297415 A1 | | 12/2011 | Katou et al. | |
| 2014/0332266 A1 | | 11/2014 | Yoshida et al. | |
| 2014/0338971 A1 | | 11/2014 | Yoshida et al. | |

* cited by examiner

EXTERIOR END PORTION CAP AND WIRE HARNESS

CROSS REFERENCE TO RELATED APPLICATIONS

This application is based on Japanese Patent Application (No. 2016-236460) filed on Dec. 6, 2016, the contents of which are incorporated herein by reference.

BACKGROUND OF THE INVENTION

1. Field of the Invention

The present invention relates to an exterior end portion cap which is attached to an end portion of an exterior member. The invention also relates to a wire harness which is configured to include the exterior end portion cap.

2. Description of the Related Art

A wire harness is used for electrically connecting devices mounted in a car to each other. The wire harness is configured to include an exterior member shaped like a tubular body, and one electrically conductive path or a plurality of electrically conductive paths housed in the exterior member. For example, a wire harness disclosed in JP-A-2011-254614 is routed to pass through a vehicle underfloor of a car. Of the wire harness, a portion corresponding to the vehicle underfloor is routed straightly. Such a wire harness is formed to have a long length. Incidentally, the following thing particularly about the straightly routed portion is disclosed in JP-A-2011-254614. That is, it is known that there is a possibility that an electrically conductive path or electrically conductive paths inside an exterior member may shake due to vibration during running etc.

The above related art has the following problem. That is, when the electrically conductive path or each of the electrically conductive paths inside the exterior member shakes largely due to the vibration during running, a coating (a braid or metal foil in an outer side of the electrically conductive path when the electrically conductive path has a shield function) of the electrically conductive path may strike against a tubular inner surface (inner circumferential surface) of the exterior member. On that occasion, sand etc. may intrude into the exterior member. In this case, there is a problem that the coating, the braid, etc. may be damaged easily.

As a solution to this problem, the following structure is generally used. That is, taping is applied to an end portion of the exterior member to prevent sand etc. from intruding between the end portion and the electrically conductive path or paths. However, the structure has the following problem. That is, when, for example, the taping is not applied sufficiently, sand may intrude through a gap between adjacent ones of windings of the taping or a gap between adjacent ones of the electrically conductive paths. As a result, there is a problem that the intrusion of the sand may lead to the aforementioned damage.

SUMMARY OF THE INVENTION

The invention has been accomplished in consideration of the above circumstances. An object of the invention is to provide an exterior end portion cap which can prevent damage on an electrically conductive path inside an exterior member, and a wire harness which is configured to include the exterior end portion cap.

According to a first configuration of the invention which has been accomplished in order to attain the object, there is provided an exterior end portion cap to be attached to an electrically conductive path and an exterior member having a tubular shape, and the electrically conductive path being led out from the exterior member, the exterior end portion cap including:

an external exposure portion having a first blocking portion and configured to be exposed to an outer side of the exterior member;

an internal insertion portion having a second block portion and being continuous to the external exposure portion; and an electrically conductive path housing recess portion formed to extend across the external exposure portion and the internal insertion portion, wherein:

the first blocking portion is disposed on a side to which the internal insertion portion is continuous, and has a planar portion configured to abut against an end portion of the exterior member;

the second blocking portion has holding piece portions that are disposed at both sides of the electrically conductive path housing recess portion so as to be opposed to each other, and that are deformable to wind around an outer surface of the electrically conductive path circumferentially; and the electrically conductive path housing recess portion is formed into a concave portion that is so deep that a part of an outer surface of the electrically conductive path is pressed against an inner surface of the exterior member near the end portion in order to make the part of the outer surface of the electrically conductive path as a third blocking portion.

In addition, in order to attain the object, there is provided a wire harness including:

an exterior member having a tubular shape;

an electrically conductive path that is protected by the exterior member; and the exterior end portion cap that is attached to the electrically conductive path and an end portion of the exterior member.

According to the above configuration of the invention, the end portion of the exterior member can be blocked by the first blocking portion of the exterior end portion cap. In addition, the inner surface of the exterior member can be also blocked circumferentially by the second blocking portion of the exterior end portion cap and the electrically conductive path (the function of the third blocking portion) housed in the electrically conductive path housing recess portion of the exterior end portion cap. By the first to third blocking portions, for example, sand etc. can be prevented from intruding into the exterior member from the outside even if the sand etc. tries to intrude. Accordingly, when the exterior end portion cap according to the invention is used, an effect that the sand etc. can be prevented from easily intruding into the exterior member is obtained in comparison with a case where, for example, only taping is applied to the end portion of the exterior member. According to the invention as understood from the above description, the sand etc. is absent from the exterior member even when the electrically conductive path shakes, for example, due to vibration during running. Accordingly, an effect that the electrically conductive path can be prevented from being damaged easily is obtained.

According to the above configuration of the invention, there is provided the wire harness configured to include the exterior end portion cap. Accordingly, for example, sand etc. can be prevented from intruding into the exterior member from the outside even if the sand etc. tries to intrude. As a result, an effect that damage on the electrically conductive path inside the exterior member can be prevented is obtained.

DETAILED DESCRIPTION OF THE EXEMPLARY EMBODIMENTS

A wire harness is configured to include an exterior member shaped like a tubular body, an electrically conductive path protected by the exterior member, and exterior end portion caps. The exterior end portion caps are attached to end portions of the exterior member out of which the electrically conductive path is led. An external exposure portion having a first blocking portion, an internal insertion portion having second blocking portions, and an electrically conductive path housing recess portion by which one portion of an outer surface of the electrically conductive path can be made to function as a third blocking portion are formed in each of such exterior end portion caps. The first blocking portion is formed into a planar shape portion which abuts against the end portion of the exterior member. The second blocking portions are formed into thin piece portions which are deformable to wind around the outer surface of the electrically conductive path circumferentially. The electrically conductive path housing recess portion is formed into a concave portion which is so deep that the one portion of the electrically conductive path can be pressed against an inner surface of the exterior member near the end portion.

Example

Figure 1A:
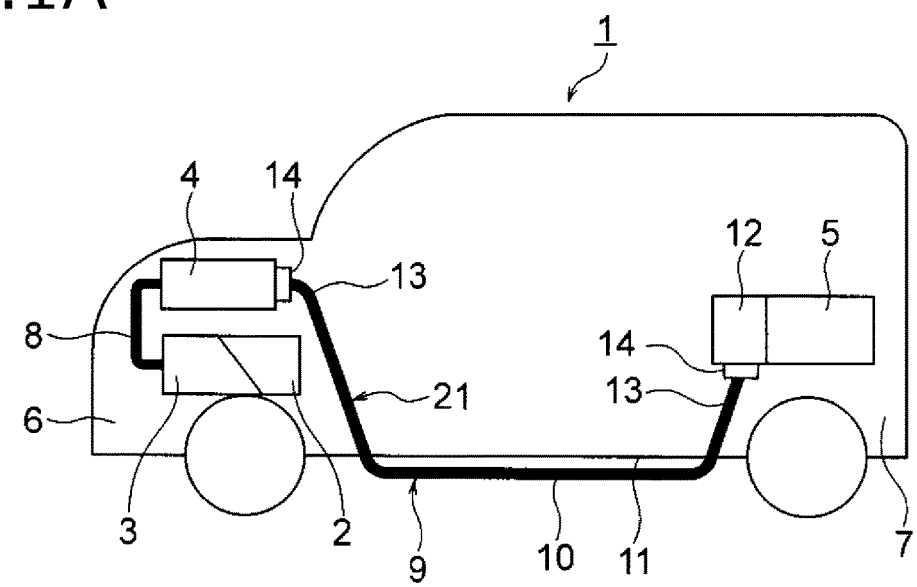
FIGS. 1A and 1B are views showing wire harnesses according to the invention, FIG. 1A being a schematic view showing a state in which high-voltage wire harnesses are routed, FIG. 1B being a schematic view showing a state in which a low-voltage wire harness different from those in FIG. 1A is routed.
Figure 1B:
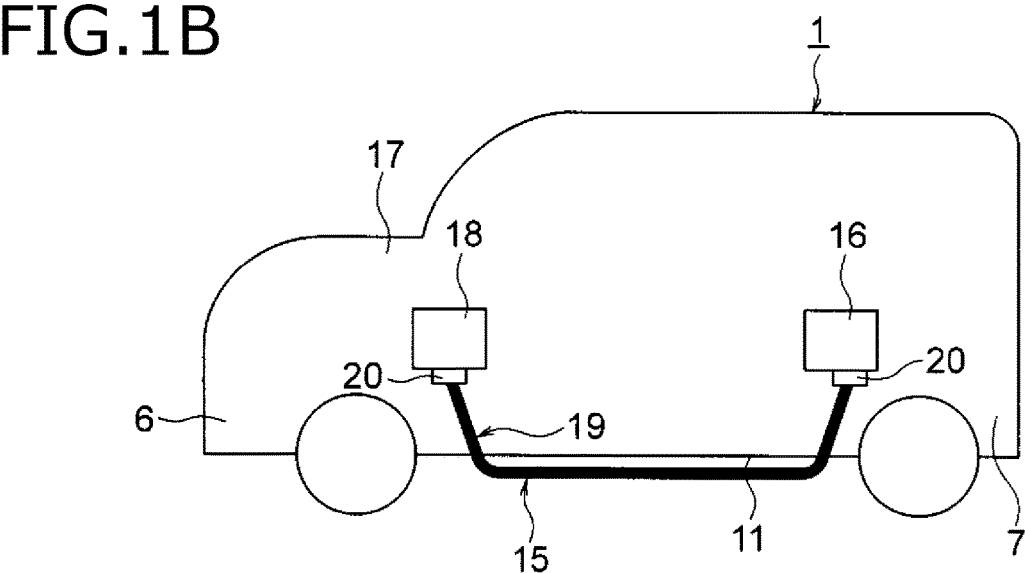
Figure 2:
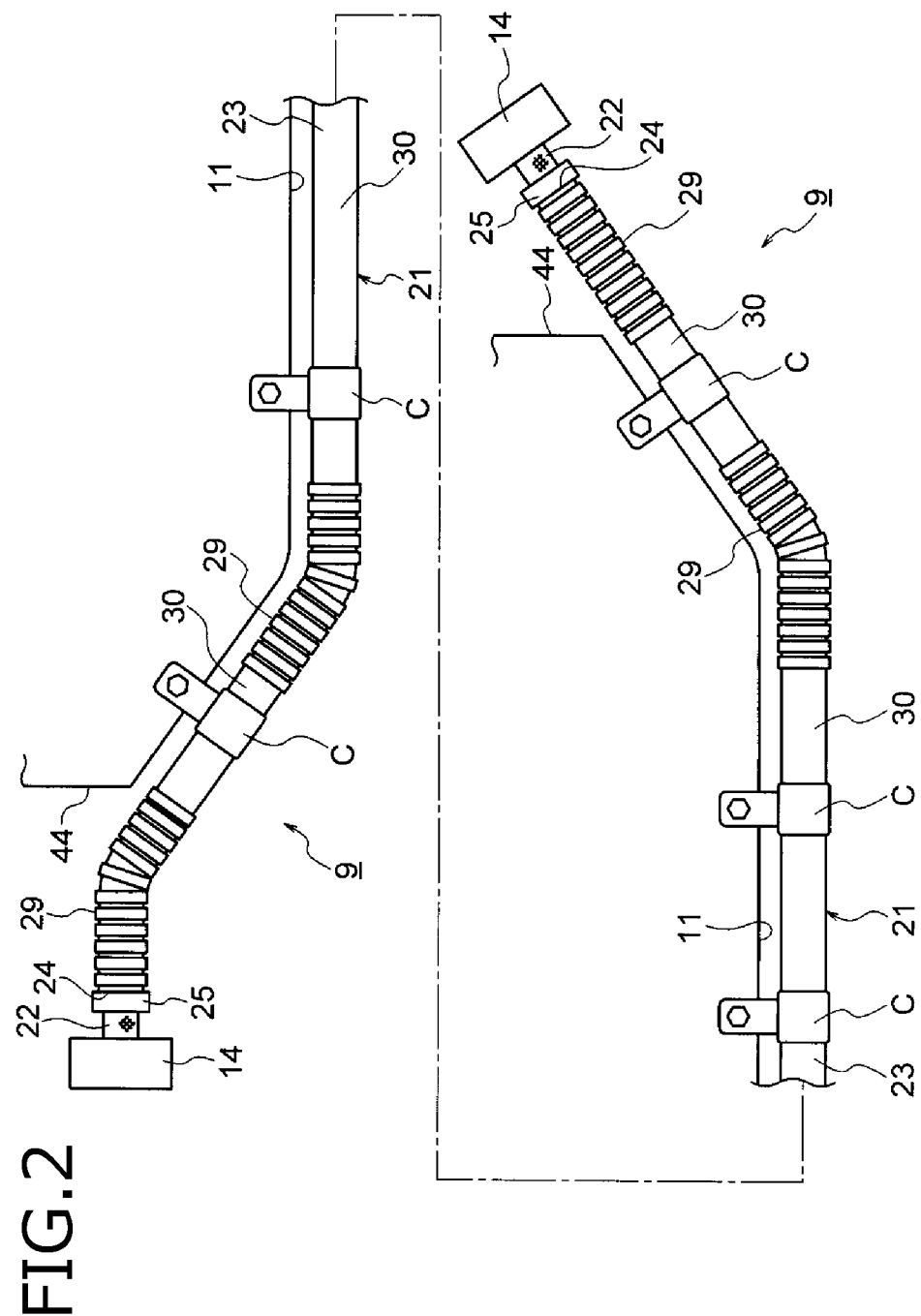
FIG. 2 is a view showing a state in which a path of one of the wire harnesses in FIG. 1A is routed, and the configuration of the wire harness in FIG. 1A.
Figure 3:
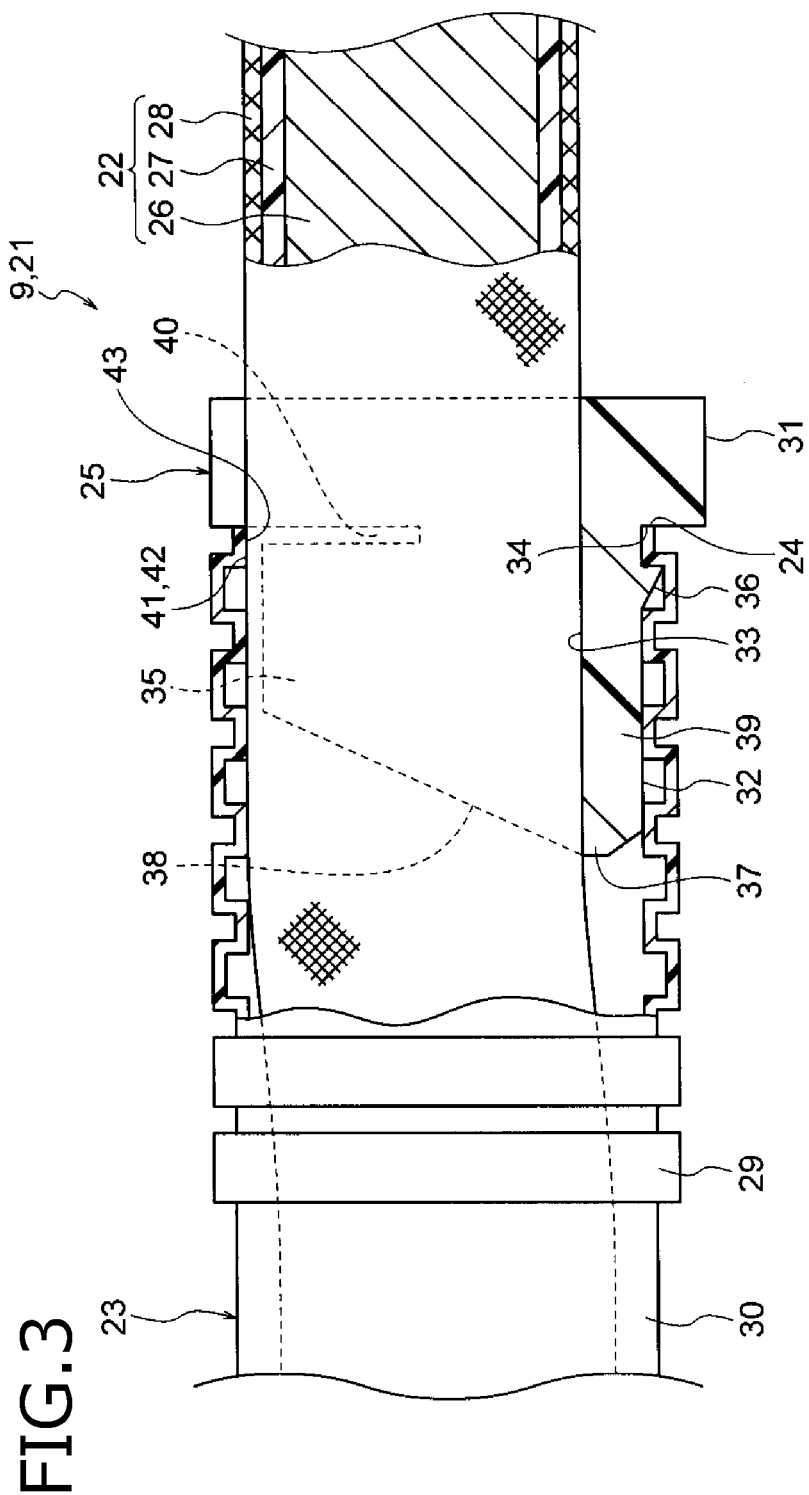
FIG. 3 is a longitudinal sectional view showing the configuration of an exterior end portion cap according to the invention in a harness terminal in FIG. 2.

Example will be described below with reference to the drawings. FIGS. 1A and 1B are views showing wire harnesses according to the invention. FIG. 1A is a schematic view showing a state in which high-voltage wire harnesses are routed. FIG. 1B is a schematic view showing a state in which a low-voltage wire harness different from those in FIG. 1A is routed. FIG. 2 is a view showing a state in which a path of one of the wire harnesses in FIG. 1A is routed, and the configuration of the wire harness in FIG. 1A. FIG. 3 is a longitudinal sectional view showing the configuration of an exterior end portion cap according to the invention in a harness terminal in FIG. 2.

Figure 4:
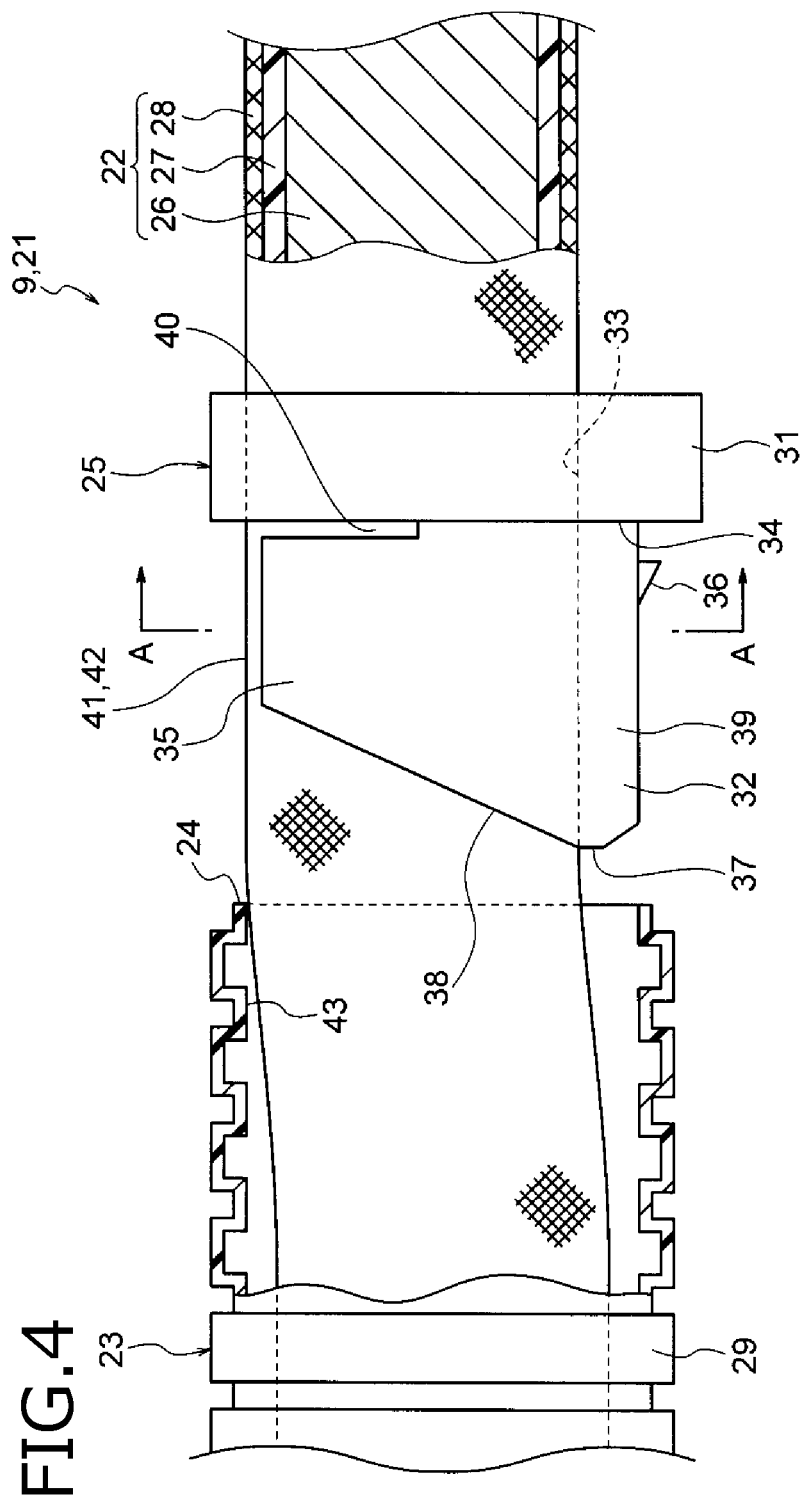
FIG. 4 is a view showing a state immediately before the exterior end portion cap is attached to an end portion of an exterior member.
Figure 5:
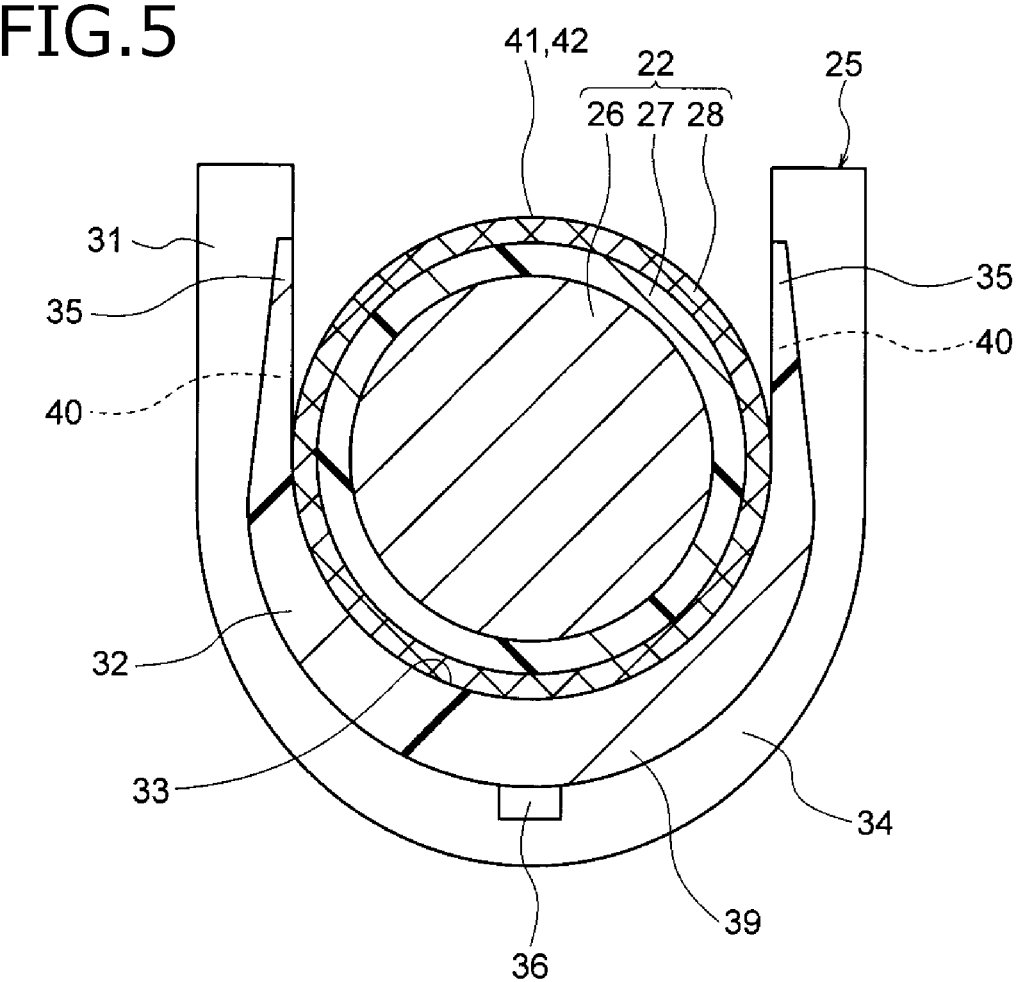
FIG. 5 is a sectional view taken along a line A-A of FIG. 4.
Figure 6:
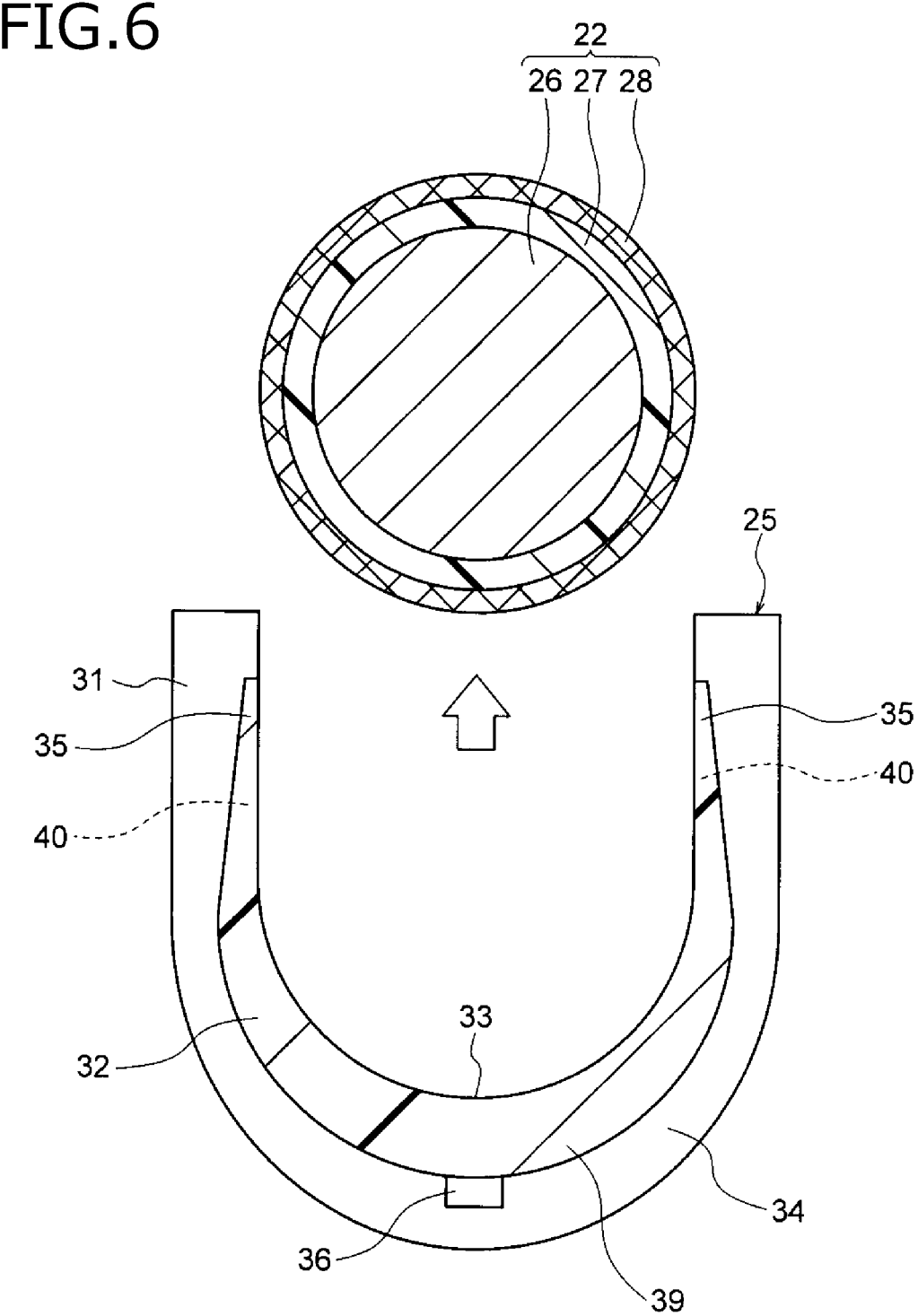
FIG. 6 is a view showing a state immediately before an electrically conductive path housing recess portion is put onto an electrically conduction path.
Figure 7:
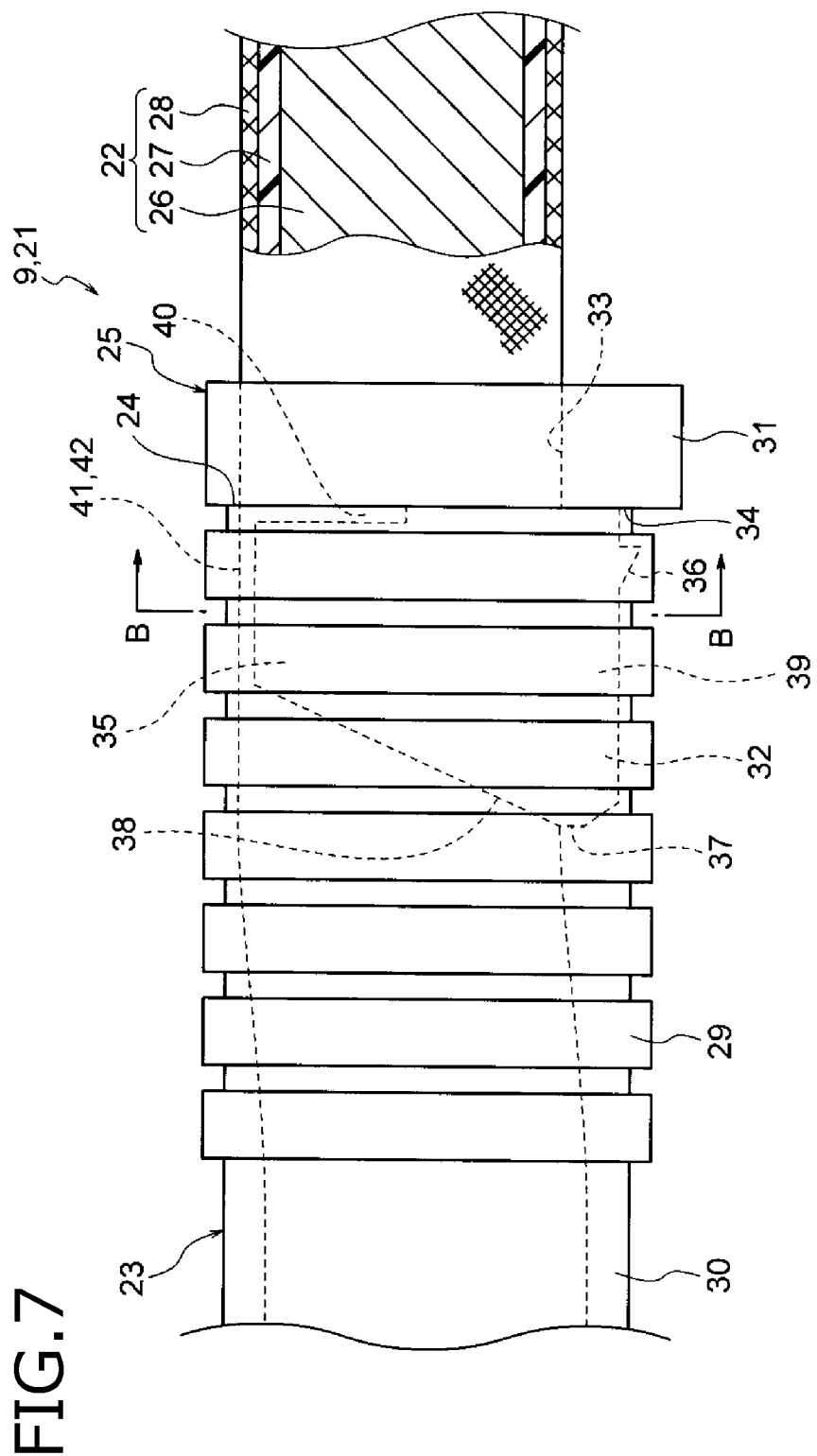
FIG. 7 is a view showing a state in which the exterior end portion cap has been attached to the end portion of the exterior member.
Figure 8:
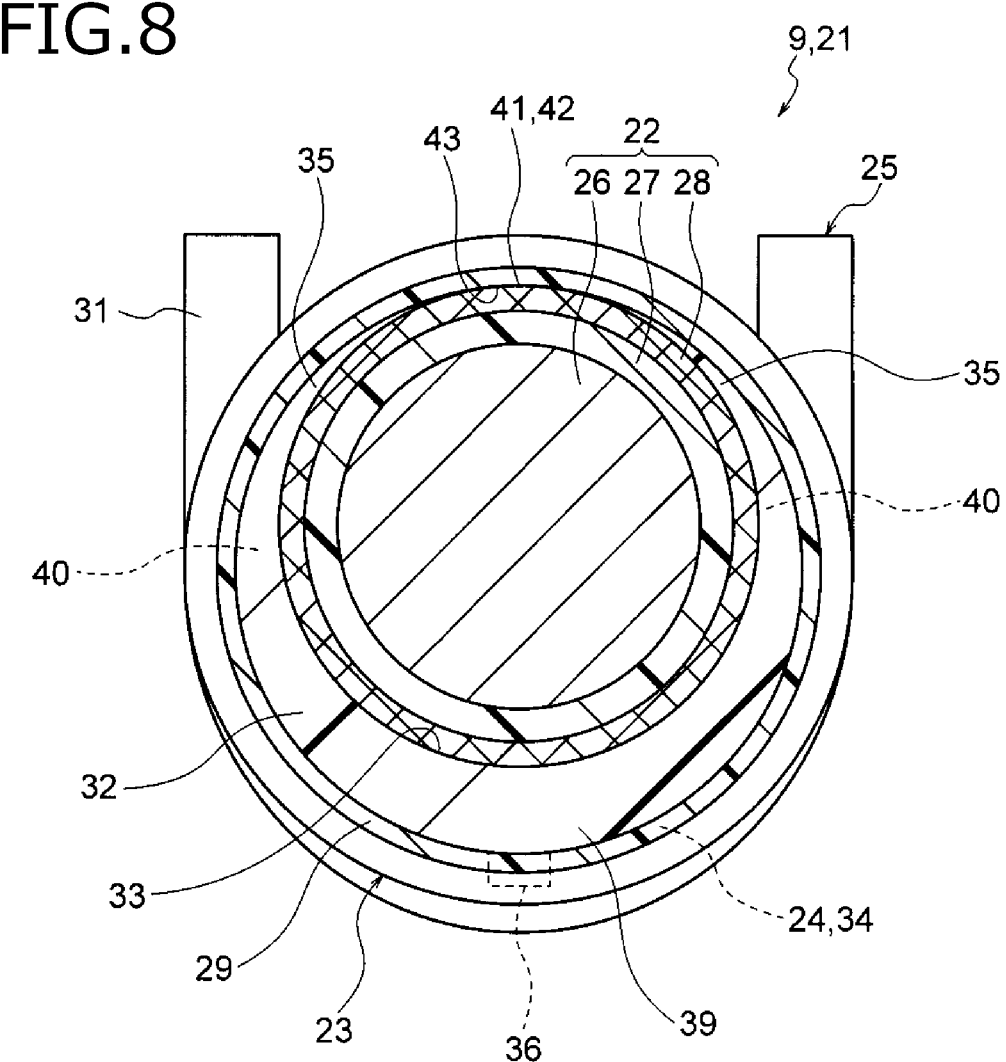
FIG. 8 is a sectional view taken along a line B-B of FIG. 7.

FIG. 4 is a view showing a state immediately before the exterior end portion cap is attached to an end portion of an exterior member. FIG. 5 is a sectional view taken along a line A-A of FIG. 4. FIG. 6 is a view showing a state immediately before an electrically conductive path housing recess portion is put onto an electrically conductive path. FIG. 7 is a view showing a state in which the exterior end portion cap has been attached to the end portion of the exterior member. FIG. 8 is a sectional view taken along a line B-B of FIG. 7.

In the Example, the invention is used for a wire harness which is routed in a hybrid car (which may be alternatively an electric car, a general car running using an engine, etc.).

<About Configuration of Hybrid Car 1>

In FIG. 1A, the reference sign 1 designates a hybrid car. The hybrid car 1 is a vehicle which is driven by a mixture of two motive powers of an engine 2 and a motor unit 3. Electric power from a battery 5 (battery pack) is supplied to the motor unit 3 through an inverter unit 4. The engine 2, the motor unit 3 and the inverter unit 4 are mounted in an engine room 6 where front wheels etc. are located in the Example. In addition, the battery 5 is mounted in a car rear portion 7 where rear wheels etc. are located (the battery 5 may be alternatively mounted in a car cabin present at the rear of the engine room 6).

The motor unit 3 and the inverter unit 4 are connected to each other through a high-voltage wire harness 8 (high-voltage motor cable). In addition, the battery 5 and the inverter unit 4 are also connected to each other through a high-voltage wire harness 9. Of the wire harness 9, an intermediate portion 10 is routed on a vehicle underfloor 11 in the vehicle (vehicle body). In addition, the intermediate portion 10 is routed substantially in parallel with the vehicle underfloor 11. The vehicle underfloor 11 is a known body (vehicle body) and a so-called panel member. Through holes are formed at predetermined positions of the vehicle underfloor 11. The wire harness 9 is inserted through the through holes airtightly.

The wire harness 9 and the battery 5 are connected to each other through a junction block 12 provided in the battery 5. An external connection piece such as a shield connector 14 provided and disposed on a rear end-side harness terminal 13 of the wire harness 9 is electrically connected to the junction block 12. In addition, the wire harness 9 and the inverter unit 4 are electrically connected to each other through an external connection piece such as a shield connector 14 provided and disposed on a front end-side harness terminal 13 of the wire harness 9.

The monitor unit 3 is configured to include a motor and a generator. In addition, the inverter unit 4 is configured to include an inverter and a converter. The motor unit 3 is formed as a motor assembly including a shielding case. In addition, the inverter unit 4 is also formed as an inverter assembly including a shielding case. The battery 5 is of an Ni-MH type or an Li-ion type which is formed to be modularized. Incidentally, an electric storage device such as a capacitor may be used. It is a matter of course that any device may be used as the battery 5 without any particular limitation as long as the device can be used in the hybrid car 1 or an electric car.

In FIG. 1B, the reference sign 15 designates a wire harness. The wire harness 15 is a low-voltage wire harness (for low voltage use) which is provided for electrically connecting a low-voltage battery 16 of the car rear portion 7 in the hybrid car 1 to an accessory 18 (device) mounted in a car front portion 17. The wire harness 15 is routed to pass through the vehicle underfloor 11 in the same manner as the wire harness 9 in FIG. 1A (This is merely an example. The wire harness 15 may be routed to pass through the cabin side). The reference sign 19 in the wire harness 15 designates a harness body. In addition, the reference sign 20 designates a connector.

As shown in FIGS. 1A and 1B, the high-voltage wire harnesses 8 and 9 and the low-voltage wire harness 15 are routed in the hybrid car 1. The invention can be applied to any of these wire harnesses. However, the high-voltage wire harness 9 will be taken as a representative example and described below. The configuration and the structure of the wire harness 9 will be described first.

<About Configuration of Wire Harness 9>

In FIG. 1A and FIG. 2, the long wire harness 9 routed to pass through the vehicle underfloor 11 is configured to include a harness body 21 and the shield connectors 14 (external connection pieces) which are provided and disposed on the opposite terminals (harness terminals 13) of the harness body 21 respectively. In addition, the wire harness 9 is configured to include clamps C for routing the wire harness 9 to predetermined positions, and not-shown water sealing members (e.g. grommets etc.).

<About Configuration of Harness Body 21>

In FIG. 2 and FIG. 3, the harness body 21 is configured to include a long electrically conductive path 22, an exterior member 23 which houses and protects the electrically conductive path 22, and exterior end portion caps 25 according to the invention which are attached to end portions 24 of the exterior member 23 out of which the electrically conductive path 22 is led.

<About Electrically Conductive Path 22>

In FIG. 3 and FIG. 6, the electrically conductive path 22 is configured to include an electrically conductive conductor 26, an insulating insulator 27 with which the conductor is coated, a braid 28 (shield member) which is provided for fulfilling a shield function. That is, an electrically conductive path from which a sheath is absent (this is merely an example) is used as the electrically conductive path 22. Due to absence of the sheath from the electrically conductive path 22, it is a matter of course that the electrically conductive path 22 is light in weight accordingly (Since the electrically conductive path 22 is long, it is a matter of course that the weight of the electrically conductive path 22 can be reduced much more greatly than a background-art example).

<About Conductor 26>

In FIG. 3 and FIG. 6, the conductor 26 is made of copper, a copper alloy, aluminum or an aluminum alloy and formed into a circular shape in section. The conductor 26 may be either a conductor having a conductor structure of twisted strands or a conductor having a sectionally circular (round) rod-like conductor structure (e.g. a conductor structure which serves as a round single core. In this case, the electrically conductive path itself is also shaped like a rod). The insulator 27 made of an insulating resin material is formed on an outer surface of the conductor 26 by extrusion molding.

<About Insulator 27>

In FIG. 3 and FIG. 6, the insulator 27 is formed on the outer circumferential surface of the conductor 26 by extrusion molding out of a thermoplastic resin material. The insulator 27 is formed as a coating shaped like a circle in section. The insulator 27 is formed to have a predetermined thickness. Various known kinds of resins can be used as the aforementioned thermoplastic resin. For example, the thermoplastic resin may be selected suitably from high polymer materials such as a polyvinylchloride resin, a polyethylene resin and a polypropylene resin.

<About Braid 28>

In FIG. 3 and FIG. 6, the braid 28 is provided as an outermost layer of the electrically conductive path 22. Such a braid 28 is formed by braiding electrically conductive ultrafine strands into a cylinder. In addition, the braid 28 is formed into such a shape and such a size that an outer circumferential surface of the insulator 27 extending from one end to the other end thereof is covered with the braid 28. Incidentally, the invention is not limited to the braid 28. For example, metal foil etc. may be used as a shield member.

The braid 28 according to the Example is the outermost layer of the electrically conductive path 22. Accordingly, one portion of the electrically conductive path 22 functions as a "third blocking portion" described in Claims (its details and reference sign will be described later).

<About Exterior Member 23>

In FIG. 2 and FIG. 3, the exterior member 23 is formed into a straight tubular body shape (which is straight prior to use) by molding out of an insulating resin. In addition, the exterior member 23 is formed into an unslitted shape (in other words, formed into a shape having no slit (or formed into a shape which is not a split tube shape)). Further, the exterior member 23 is formed into a sectionally circular shape suited to shape of the electrically conductive path 22.

Such an exterior member 23 has flexible tubular portions 29 having flexibility, and straight tubular portions 30 serving as portions where the electrically conductive path 22 is routed straightly (This configuration is merely an example. For example, the entire exterior member 23 may be a flexible tubular portion 29). The flexible tubular portions 29 and the straight tubular portions 30 are formed in a tubular axial direction. In addition, the flexible tubular portions 29 and the straight tubular portions 30 are formed and disposed alternately.

<About Flexible Tubular Portions 29>

In FIG. 2 and FIG. 3, the flexible tubular portions 29 are disposed in accordance with a vehicle attachment shape (a shape of a destination to which the wire harness is routed, or a shape of an attachment subject 44 which will be described later). In addition, the flexible tubular portions 29 are formed to also have lengths suited to the vehicle attachment shape. The lengths of the flexible tubular portions 29 are not fixed but may be formed as required lengths suited to the vehicle attachment shape respectively. Such flexible tubular portions 29 are formed to be able to be flexed at desired angles respectively in a packed state and during transportation of the wire harness 9, and further during routing of a path of the wire harness 9 in the vehicle. That is, the flexible tubular portions 29 are formed to be able to be flexed into bent shapes, and, of course, to be able to be returned to their original straight states (the states when the resin is molded). Each of the flexible tubular portions 29 according to the Example is formed into a corrugated tubular shape having bellows recesses and bellows protrusions (this is merely an example).

<About Straight Tubular Portions 30>

In FIG. 2 and FIG. 3, the straight tubular portions 30 are formed as portions which do not have flexibility like the flexible tubular portions 29. In addition, the straight tubular portions 30 are formed also as portions which do not bend in the packed state, during the transportation, and further during the routing of the path (the non-bending portions mean portions which do not have flexibility aggressively). The straight tubular portions 30 are formed into long straight tubular shapes. Each of outer circumferential surfaces of such straight tubular portions 30 is formed into a smooth shape (this is merely an example).

The straight tubular portions 30 are formed into rigid portions in comparison with the flexible tubular portions 29. Each of such straight tubular portions 30 is formed at a position with a length in accordance with the vehicle attachment shape. Incidentally, of the straight tubular portions 30, a longest one 30 is formed as a portion disposed on the vehicle underfloor 11 in the Example.

<About Exterior End Portion Cap 25>

In FIGS. 2 to 8, the exterior end portion cap 25 is a resin molded item which is, for example, made of a resin material having weather resistance, heat resistance, etc. The exterior end portion cap 25 is not only attached to one electrically conductive path 22 but also attached to the exterior member 23 out of which the electrically conductive path 22 is led. The exterior end portion cap 25 is provided, for example, for preventing sand etc. from intruding into (an internal portion of) the exterior member 23 from the outside even if the sand etc. tries to intrude. In addition, the exterior end portion cap 25 is provided also for preventing damage on the electrically conductive path 22 inside the exterior member 23. An external exposure portion 31, an internal insertion portion 32 which is continuous to the external exposure portion 31, and an electrically conductive path housing recess 33 which extends across the external exposure portion 31 and the internal insertion portion 32 are formed in such an exterior end portion cap 25.

<About External Exposure Portion 31>

In FIGS. 3 to 8, the external exposure portion 31 is formed as a portion exposed to an outer side of the exterior member 23. The external exposure portion 31 is formed to be larger in size than the end portion 24 of the exterior member 23. In addition, the external exposure portion 31 is also formed into a size large enough so that a worker can hold the external exposure portion 31 in his/her hand so as to perform insertion work of the exterior end portion cap 25 into the exterior member 23. Such an external exposure portion 31 is formed substantially into a U-shape in section due to the presence of the electrically conductive path housing recess 33. A first blocking portion 34 is formed in the external exposure portion 31. The first blocking portion 34 is formed as one of characteristic portions of the invention.

<About First Blocking Portion 34>

In FIGS. 3 to 8, the first blocking portion 34 is formed and disposed on a side opposed to the end portion 24 of the exterior member 23. The first blocking portion 34 is formed into a plane which can abut against the end portion 24 to block the end portion 24 at the abutment portion (The first blocking portion 34 is formed into a planar shape. In addition thereto, the first blocking portion 34 may alternatively have a groove shape or a step shape into which the end portion 24 can be inserted).

Incidentally, in the Example, a bellows recess portion of the exterior member 23 is formed as the end portion 24. However, the invention is not limited thereto. Alternatively, a bellows protrusion portion of the exterior member 23 may serve as the end portion 24. The first blocking portion 34 is formed as a portion which abuts against such an end portion 24 to prevent, for example, sand etc. from intruding into (the internal portion of) the exterior member 23 from the outside even if the sand etc. tries to intrude.

<About Internal Insertion Portion 32>

In FIGS. 3 to 8, the internal insertion portion 32 is continuous to the external exposure portion 31 and formed substantially into a U-shape in section smaller than the external exposure portion 31. The internal insertion portion 32 is formed as a portion inserted into the exterior member 23. A pair of second blocking portions 35 and a detachment preventing portion 36 are formed in such an internal insertion portion 32. In addition, a side-view tapered portion 38 is also formed in the internal insertion portion 32 to be tapered in a range of from an insertion front end portion 37 inserted into the exterior member 23 to the pair of second blocking portions 35.

<About One Pair of Second Blocking Portions 35>

In FIGS. 3 to 8, the pair of second blocking portions 35 serving as one of the characteristic portions of the invention are formed and disposed in positions holding the electrically conductive path housing recess 33 therebetween. In addition, the pair of second blocking portions 35 are formed and disposed to be opposed to each other. The pair of second blocking portions 35 are formed into thin piece portions which are deformable and protrude upward from opposite side portions of an internal insertion portion body 39. Incidentally, the expression "deformable" means that the pair of the second blocking portions 35 can be deformed to circumferentially wind around an outer surface (the braid 28 which is the outermost layer) of the electrically conductive path 22. In order to make the pair of the second blocking portions 35 deformable, slits 40 are formed between the pair of the second blocking portions 35 and the external exposure portion 31 respectively in the Example.

The pair of second blocking portions 35 are formed and disposed in the vicinity of the first blocking portion 34 in the external exposure portion 31. In addition, the pair of second blocking portions 35 are formed as portions which prevent, for example, sand etc. from intruding into (the internal portion of) the exterior member 23 from the outside, in the same manner as the first blocking portion 34 even if the sand etc. tries to intrude. Each of the pair of second blocking portions 35 is formed into a shape which is thinner as goes toward a protrusion front end position of the second blocking portion 35.

<About Detachment Preventing Portion 36>

In FIGS. 3 to 7, the detachment preventing portion 36 serves as a small convex portion hooked on an inner surface 43 of the exterior member 23. In the Example, the detachment preventing portion 36 is formed into a portion which is shaped like a right-angled triangle in side view and which has a tapered surface and a lock surface (As long as the detachment preventing portion 36 can be hooked, the shape of the detachment preventing portion 36 is not limited particularly. In addition, the number of such detachment preventing portions 36 is not limited). The detachment preventing portion 36 is formed and disposed on a side near the external exposure portion 31.

<About Side-View Tapered Portion 38>

In FIGS. 3 and 4, the side-view tapered portion 38 serves as a portion guided by the end portion 24 of the exterior member 23. The side-view tapered portion 38 is formed in order to contribute to reduction of an insertion load. The side-view tapered portion 38 is formed with a predetermined inclination angle from the insertion front end portion 37 of the internal insertion portion 32 to the protrusion front end positions of the pair of second blocking portions 35. Incidentally, the inclination angle is not limited particularly as long as the pair of second blocking portions 35 can wind around the outer surface of the electrically conductive path 22 smoothly in a process of being guided by the end portion 24 of the exterior member 23.

<About Electrically Conductive Path Housing Recess 33>

In FIGS. 3 to 8, the electrically conductive path housing recess 33 serves as a portion attached to the electrically conductive path 22. The electrically conductive path housing recess 33 is formed to extend across the external exposure portion 31 and the internal insertion portion 32, as described above. In addition, the electrically conductive path housing recess 33 is formed into an illustrated substantially U-shaped concave portion (groove portion) which has a semicircular arc-shaped bottom wall portion (the internal insertion portion body 39) suited to the diameter of the electrically conductive path 22, and side wall portions rising upward from opposite sides of the bottom wall portion. Further, the electrically conductive path housing recess 33 is formed to be so deep that one portion 41 (one portion of the braid 28 which is the outermost layer) of the electrically conductive path 22 can be pressed against the inner surface 43 of the exterior member 23 near the end portion 24 in order to make the one portion 41 function as a third blocking portion 42. In the internal insertion portion 32, the pair of second blocking portions 35 correspond to the side wall portions.

Incidentally, the function as the third blocking portion 42 is a function for preventing, for example, sand etc. from intruding into (the internal portion of) the exterior member 23 from the outside even if the sand etc. tries to intrude. That is, the third blocking portion 42 has the same function as the first blocking portion 34 and the pair of second blocking portions 35. The third blocking portion 42 corresponds to a range which cannot be blocked by the first blocking portion 34 and the pair of second blocking portions 35 when the outer surface (the braid 28 which is the outermost layer) of the electrically conductive path 22 is viewed circumferentially.

<About Attachment of Exterior End Portion Cap 25>

In FIG. 6, first, the exterior end portion cap 25 is attached to the electrically conductive path 22. The attachment is performed in a state in which the exterior end portion cap 25 is disposed under the electrically conductive path 22 so that the electrically conductive path housing recess 33 of the exterior end portion cap 25 is put onto the electrically conductive path 22 (in other words, the attachment is performed in a state in which the electrically conductive path 22 is inserted into the electrically conductive path housing recess 33). When the attachment of the exterior end portion cap 25 to the electrically conductive path 22 is completed, the exterior end portion cap 25 and the electrically conductive path 22 are in a state shown in FIGS. 4 and 5.

Next, the exterior end portion cap 25 is attached to the end portion 24 of the exterior member 23. The attachment is performed in a state in which the insertion front end portion 37 of the internal insertion portion 32 in the exterior end portion cap 25 is inserted into the end portion 24 of the exterior member 23. During the attachment of the exterior end portion cap 25, the side-view tapered portion 38 in the internal insertion portion 32 is guided by the end portion 24 of the exterior member 23. On this occasion, the pair of second blocking portions 35 come into a state where they wind around the outer surface of the electrically conductive path 22. In addition, while slightly pushing and expanding the end portion 24 of the exterior member 23, the detachment preventing portion 36 of the internal insertion portion 32 passes through the end portion 24 of the exterior member 23 to be fitted into a recess of the inner surface 43 in the exterior member 23. When the detachment preventing portion 36 is hooked on the recess of the inner surface 43 to be prevented from being detached, the first blocking portion 34 of the external exposure portion 31 abuts against (makes surface contact with) the end portion 24 of the exterior member 23 simultaneously. Thus, the end portion 24 of the exterior member 23 is blocked by the first blocking portion 34 of the external exposure portion 31, as shown in FIG. 3, FIG. 7 and FIG. 8. In addition, the end portion 24 of the exterior member 23 is also blocked by the pair of second blocking portions 35 and the third blocking portion 42. Incidentally, when the end portion 24 of the exterior member 23 is blocked in this state, the electrically conductive path 22 is retained without looseness in the position of the end portion 24 of the exterior member 23.

<About Manufacturing to Path Routing of Wire Harness 9>

In the configuration and structure, a wire harness 9 is manufactured in the following manner (e.g. see FIG. 2, FIG. 3 and FIG. 7). That is, the wire harness 9 is manufactured by inserting two electrically conductive paths 22 from an opening at one end of an exterior member 23 toward an opening at the other end of the exterior member 23. The exterior member 23 is molded substantially linearly as a whole out of a resin. In addition, the wire harness 9 is manufactured by blocking end portions 24 of the exterior member 23 with exterior end portion caps 25 (with first blocking portions 34 to third blocking portions 42). Further, the wire harness 9 is manufactured by attaching clamps C, grommets, boots, etc. to predetermined positions of an outer surface of the exterior member 23. Further, the wire harness 9 is manufactured by providing shield connectors 14 on terminal portions of the electrically conductive paths 22.

After the wire harness 9 is manufactured in the manner, predetermined flexible tubular portions 29 are bent to be folded. Thus, packing of the wire harness 9 is completed. The wire harness 9 in the packed state is compact so that the wire harness 9 can be transported in such a compact state to a vehicle assembling site.

In the vehicle assembling site, the wire harness 9 is attached to an attachment subject 44 (structure body) of a vehicle, starting at a long portion corresponding to a vehicle underfloor 11. A longest straight tubular portion 30 of the exterior member 23 in the wire harness 9 is disposed on the long portion corresponding to the vehicle underfloor 11. Accordingly, the wire harness 9 is attached in a state in which flexure of the wire harness 9 is suppressed. On this occasion, the wire harness 9 is attached with excellent workability. After the long portion corresponding to the vehicle underfloor 11 is fixed by the clamps C etc., the remaining portion of the exterior member 23 is attached while the flexible tubular portions 29 are flexed (bent). When a series of works relevant to the attachment are completed, the wire harness 9 is routed in a desired path.

About Advantageous Effects of Invention

When each of the exterior end portion caps 25 is used as described above with reference to FIGS. 1A and 1B and FIGS. 2 to 8, sand etc. can be prevented from being easily intruding into the exterior member 23 in comparison with a case where, for example, only taping is applied to the end portion of the exterior member. Accordingly, according to the invention, the sand etc. is absent from the exterior member 23 even when the electrically conductive paths 22 shake, for example, due to vibration during running. As a result, an effect that damage on the electrically conductive path 22 inside the exterior member 23 can be prevented is obtained.

Here, the above embodiments are summarized as follows.
(1) There is provided an exterior end portion cap to be attached to an electrically conductive path and an exterior member having a tubular shape, and the electrically conductive path being led out from the exterior member, the exterior end portion cap including:
an external exposure portion having a first blocking portion and configured to be exposed to an outer side of the exterior member;
an internal insertion portion having a second block portion and being continuous to the external exposure portion; and
an electrically conductive path housing recess portion formed to extend across the external exposure portion and the internal insertion portion, wherein:
the first blocking portion is disposed on a side to which the internal insertion portion is continuous, and has a planar portion configured to abut against an end portion of the exterior member;
the second blocking portion has holding piece portions that are disposed at both sides of the electrically conductive path housing recess portion so as to be opposed to each other, and that are deformable to wind around an outer surface of the electrically conductive path circumferentially; and
the electrically conductive path housing recess portion is formed into a concave portion that is so deep that a part of an outer surface of the electrically conductive path is pressed against an inner surface of the exterior member near the end portion in order to make the part of the outer surface of the electrically conductive path as a third blocking portion.
(2) For example, a detachment preventing portion configured to be engaged with the inner surface of the exterior member is provided on an outer surface of the internal insertion portion.
(3) For example, a tapered portion is extended from an insertion front end portion of the internal insertion portion to the second blocking portion in an inclined direction being inclined with an insertion direction in which the insertion front end portion is inserted into the exterior member.
(4) In addition, there is provided a wire harness including:
an exterior member having a tubular shape;
an electrically conductive path that is protected by the exterior member; and
the exterior end portion cap according to any one of above first to third configuration that is attached to the electrically conductive path and an end portion of the exterior member.

According to the above item (1), the end portion of the exterior member can be blocked by the first blocking portion of the exterior end portion cap. In addition, the inner surface of the exterior member can be also blocked circumferentially by the second blocking portion of the exterior end portion cap and the electrically conductive path (the function of the third blocking portion) housed in the electrically conductive path housing recess portion of the exterior end portion cap. By the first to third blocking portions, for example, sand etc. can be prevented from intruding into the exterior member from the outside even if the sand etc. tries to intrude. Accordingly, when the exterior end portion cap according to the invention is used, an effect that the sand etc. can be prevented from easily intruding into the exterior member is obtained in comparison with a case where, for example, only taping is applied to the end portion of the exterior member. According to the invention as understood from the above description, the sand etc. is absent from the exterior member even when the electrically conductive path shakes, for example, due to vibration during running. Accordingly, an effect that the electrically conductive path can be prevented from being damaged easily is obtained.

According to the above item (2), the detachment preventing portion is provided on the outer surface of the internal insertion portion. Accordingly, an effect that the detachment preventing portion can be engaged with the inner surface of the exterior member is obtained when the exterior end portion cap is inserted into the exterior member. Accordingly, according to the invention, an effect that the exterior end portion cap can be prevented from being detached is obtained.

According to the above item (3), the tapered portion is extended from the insertion front end portion of the internal insertion portion to the second blocking portion in the inclined direction. Accordingly, the tapered portion contributes to reduction of an insertion load. As a result, an effect that workability can be improved is obtained.

According to the above item (4), there is provided the wire harness configured to include the exterior end portion cap. Accordingly, for example, sand etc. can be prevented from intruding into the exterior member from the outside even if the sand etc. tries to intrude. As a result, an effect that damage on the electrically conductive path inside the exterior member can be prevented is obtained.

It is a matter of course that the invention can be changed and carried out variously without departing from the gist of the invention.

What is claimed is:
1. An exterior end portion cap to be attached to an electrically conductive path and an exterior member having a tubular shape, and the electrically conductive path being led out from the exterior member, the exterior end portion cap comprising:
an external exposure portion having a first blocking portion and configured to be exposed to an outer side of the exterior member;
an internal insertion portion having a second blocking portion and being continuous to the external exposure portion; and
an electrically conductive path housing recess portion formed to extend across the external exposure portion and the internal insertion portion, wherein:
the first blocking portion is disposed on a side to which the internal insertion portion is continuous, and has a planar portion configured to abut against an end portion of the exterior member,
the second blocking portion has holding piece portions that are disposed at both sides of the electrically conductive path housing recess portion so as to be opposed to each other, and that are deformable to wind around an outer surface of the electrically conductive path circumferentially;
the electrically conductive path housing recess portion is formed into a concave portion that is so deep that a part of an outer surface of the electrically conductive path is offset and pressed against an inner surface of the exterior member near the end portion in order to make the part of the outer surface of the electrically conductive path as a third blocking portion; and an outer diameter of the external exposure portion is larger than an outer diameter of the end portion of the exterior member, wherein at least one vertical slit is provided such that a gap is formed in an axial direction of the exterior end portion cap between the second blocking portion and the external exposure portion, the at least one vertical slit allowing the second blocking portion to deform circumferentially to wind around the outer surface of the electrically conductive path.

2. The exterior end portion cap according to claim 1, wherein:

a detachment preventing portion configured to be engaged with the inner surface of the exterior member is provided on an outer surface of the internal insertion portion.

3. The exterior end portion cap according to claim 1, wherein:

a tapered portion is extended from an insertion front end portion of the internal insertion portion to the second blocking portion in an inclined direction being inclined with an insertion direction in which the insertion front end portion is inserted into the exterior member.

4. A wire harness comprising:

an exterior member having a tubular shape;

an electrically conductive path that is protected by the exterior member; and the exterior end portion cap according to claim 1 that is attached to the electrically conductive path and an end portion of the exterior member.

5. The exterior end portion cap according to claim 1, wherein the electrically conductive housing recess portion offsets the electrically conductive path such that a portion of the electrically conductive path within the external member is at a different elevation than a portion of the electrically conductive path outside the external member.

6. The exterior end portion cap according to claim 1, wherein a portion of the electrically conductive path extends beyond the second blocking portion such that the extended portion is pressed against the inner surface of the exterior member.

7. The exterior end portion cap according to claim 1, wherein a thickness of the holding piece portions reduces toward a protrusion front end position of the second blocking portion.

* * * * *